(12) United States Patent
Wang et al.

(10) Patent No.: US 11,447,699 B2
(45) Date of Patent: Sep. 20, 2022

(54) SOIL STABILIZATION MATERIAL BASED ON SOLID WASTE AND BIOENZYME, AND PREPARATION METHOD THEREOF

(71) Applicant: CHINA CONSTRUCTION INDUSTRIAL & ENERGY ENGINEERING GROUP CO., LTD., Nanjing (CN)

(72) Inventors: Anhui Wang, Nanjing (CN); Yanfang Zhang, Nanjing (CN); Fan Xia, Nanjing (CN); Jiaojiao Ni, Nanjing (CN); Li Ni, Nanjing (CN); Tianyu Zhou, Nanjing (CN); Zhanwei Huang, Nanjing (CN); Zengxiao Gao, Nanjing (CN)

(73) Assignee: CHINA CONSTRUCTION INDUSTRIAL & ENERGY ENGINEERING GROUP CO., LTD., Nanjing (CN)

( * ) Notice: Subject to any disclaimer, the term of this patent is extended or adjusted under 35 U.S.C. 154(b) by 0 days.

(21) Appl. No.: 17/723,541

(22) Filed: Apr. 19, 2022

(65) Prior Publication Data

US 2022/0235268 A1 Jul. 28, 2022

(30) Foreign Application Priority Data

Sep. 8, 2021 (CN) .......................... 202111051552.1

(51) Int. Cl.
| | |
|---|---|
| *C09K 17/44* | (2006.01) |
| *C04B 28/14* | (2006.01) |
| *C04B 24/14* | (2006.01) |
| *C04B 24/38* | (2006.01) |
| *C04B 24/26* | (2006.01) |
| *C04B 24/06* | (2006.01) |
| *C04B 18/16* | (2006.01) |
| *C04B 14/10* | (2006.01) |
| *C04B 14/08* | (2006.01) |
| *E02D 3/12* | (2006.01) |
| *C04B 22/06* | (2006.01) |
| *C04B 103/00* | (2006.01) |
| *C04B 111/00* | (2006.01) |

(52) U.S. Cl.
CPC .............. *C09K 17/44* (2013.01); *C04B 14/08* (2013.01); *C04B 14/102* (2013.01); *C04B 18/167* (2013.01); *C04B 22/062* (2013.01); *C04B 24/06* (2013.01); *C04B 24/14* (2013.01); *C04B 24/2676* (2013.01); *C04B 24/38* (2013.01); *C04B 28/142* (2013.01); *E02D 3/12* (2013.01); *C04B 2103/0078* (2013.01); *C04B 2111/00732* (2013.01)

(58) Field of Classification Search
CPC ..... C04B 14/08; C04B 14/102; C04B 18/167; C04B 22/062; C04B 24/06; C04B 24/14; C04B 24/38; C04B 24/2676; C04B 28/142; C04B 2103/0078; C04B 2111/00732; C09K 17/44; E02D 3/12
See application file for complete search history.

(56) References Cited

FOREIGN PATENT DOCUMENTS

| | | | | |
|---|---|---|---|---|
| CN | 101684409 A | | 3/2010 | |
| CN | 108277012 A | * | 7/2018 | ............. C09K 17/40 |
| CN | 109305792 A | | 2/2019 | |
| CN | 110041028 A | | 7/2019 | |
| CN | 110078325 A | | 8/2019 | |
| CN | 110564425 A | * | 12/2019 | |
| CN | 111187039 A | | 5/2020 | |
| CN | 111718720 A | | 9/2020 | |
| CN | 112500100 A | | 3/2021 | |
| CN | 112779016 A | | 5/2021 | |

OTHER PUBLICATIONS

Rajoria et al "A Review On Stabilization Of Soil Using Bio-Enzyme", IJRET: International Journal of Research in Engineering and Technology, vol. 3 Issue: 1, pp. 75-78. (Year: 2014).*

Panchal et al "Stabilization Of Soil Using Bio-Enzyme", International Journal of Civil Engineering and Technology (IJCIET) vol. 8, Issue 1, pp. 234-237. (Year: 2017).*

Mekonnen et al, "Application of Microbial Bioenzymes in Soil Stabilization", International Journal of Microbiology vol. 2020, 8 pages. (Year: 2020).*

* cited by examiner

*Primary Examiner* — Anthony J Green
(74) *Attorney, Agent, or Firm* — Rumit Ranjit Kanakia

(57) ABSTRACT

A soil solidification material based on solid waste and bioenzyme, and a preparation method thereof are disclosed. The soil solidification material is composed of the following components in parts by weight: recycled aggregate 22-35 parts, steel slag 20-30 parts, high-calcium fly ash 16-24 parts, the bioenzyme 5-15 parts, an inorganic adsorbent 10-18 parts, an organic adsorbent 8-20 parts, industrial waste gypsum 25-35 parts, an activator 20-30 parts, sodium citrate 1-3 parts, and slaked lime 0.02-0.2 parts. The present disclosure adopts the recycled aggregate, the steel slag, the industrial waste gypsum and the high-calcium fly ash as the main components of the soil solidification material to reduce the cost. The soil solidification material of the present disclosure prepared by optimizing the proportion is capable of significantly improving the engineering properties of the soil or the mixed contaminated soil, and has significant economic and environmental benefits.

10 Claims, 1 Drawing Sheet

SOIL STABILIZATION MATERIAL BASED ON SOLID WASTE AND BIOENZYME, AND PREPARATION METHOD THEREOF

TECHNICAL FIELD

The present disclosure relates to the technical field of soil solidification materials, and specifically relates to a soil solidification material based on solid waste and bioenzyme, and a preparation method thereof.

BACKGROUND

The higher performance of roadbed materials is required by the substantial increase in traffic volume and heavy vehicle loads. The soil commonly used as the road construction material in the projects is increasingly unable to meet the technical requirements. The large-scale on-site excavation of the soil wastes the occupied land, while transporting the soil remotely would cause the excavation of large arable land. What's more, as the policy on the energy and environmental protection is gradually improved in China, the requirements for making full use of existing materials, avoiding land waste and environmental pollution in projects are getting widespread attention. It is gradually recognized that the most commonly used soil in the projects is also a non-renewable resource. Thus, fully exerting the unique effect of the soil in the projects is extremely necessary.

Currently, a large amount of cement, sand, stone and the like are mostly used in the road construction to solidify the soil, which leads to the great increase in project cost. In the long run, it would inevitably lead to the lack of natural construction materials. The soil stabilized by lime and cement has many shortcomings, such as low strength and strength reduced with water. In a few cases, the steel slag, mineral slag, waste concrete and the like are used in the road construction to solidify the soil. However, due to the overly simple treatment of raw materials, low solidification strength and easy soil contamination, the national requirements on the energy and environmental protection cannot be met. What's worse, there is a phenomenon of "repairing in current year, and breaking in the next year" appearing on many roadbeds.

To solve the above-mentioned problems, the present disclosure provides a soil solidification material based on solid waste and bioenzyme, and a preparation method thereof.

SUMMARY

To overcome the problems such as low soil solidification strength in the prior art, the present disclosure provides a soil solidification material based on solid waste and bioenzyme, and a preparation method thereof. The present disclosure is capable of meeting the practical demands, and solving the above-mentioned technical problems.

To achieve the objects of the present disclosure, the technical solution employed by the present disclosure is that: the soil solidification material based on the solid waste and the bioenzyme is composed of the following components in parts by weight: recycled aggregate 22-35 parts, steel slag 20-30 parts, high-calcium fly ash 16-24 parts, the bioenzyme 5-15 parts, an inorganic adsorbent 10-18 parts, an organic adsorbent 8-20 parts, industrial waste gypsum 25-35 parts, an activator 20-30 parts, sodium citrate 1-3 parts, and slaked lime 0.02-0.2 part.

Preferably, the organic adsorbent is a chitosan-based adsorbent and a resin-based adsorbent. The chitosan-based adsorbent is a chitosan-alginate powder, and the resin-based adsorbent is a styrene-based polymer. The inorganic adsorbent is diatomite and attapulgite.

Free amino groups on the surface of chitosan, combining with the resin-based adsorbent, are capable of adsorbing various heavy metals, organic acids, inorganic acids and pollutants of acidic compounds in the soil, thereby improving the soil environment. Diatomite and attapulgite are capable of absorbing organic matters in the soil.

Preferably, the industrial waste gypsum is selected from a mixture of any one or more of phosphogypsum, flue gas desulfurization gypsum, citrogypsum, borogypsum, and titanogypsum. The industrial waste gypsum is a powder obtained by ultrasonically vibrating, drying, grinding, and sieving, with a particle size of 10-30 μm.

Preferably, the steel slag is a powder obtained by grinding and removing impurities from steelmaking slag, with a particle size of 1-20 μm.

Preferably, the recycled aggregate is a powder obtained by grinding, sieving and carbonizing waste concrete in construction wastes, with a particle size of 5-30 μm.

Preferably, the activator is a mixture of any one or more of sodium hydroxide, potassium hydroxide, sodium silicate, and sodium sulfate.

The method for preparing the soil solidification material based on the solid waste and the bioenzyme comprises the following steps:

S1: weighing the recycled aggregate 22-35 parts, the industrial waste gypsum 25-35 parts, the steel slag 20-30 parts, the high-calcium fly ash 16-24 parts, the bioenzyme 5-15 parts, diatomite 5-9 parts, attapulgite 5-9 parts, the chitosan-based adsorbent 4-10 parts, the resin-based adsorbent 4-10 parts, the activator 20-30 parts, sodium citrate 1-3 parts, and the slaked lime 0.02-0.2 part;

S2: performing a microwave irradiation treatment on the recycled aggregate for 15-24 min with a microwave power density of 1.714 W/cm², then grinding and carrying out pneumatic separation to obtain an active recycled aggregate and an inert recycled aggregate; sieving the inert recycled aggregate to obtain a coarse recycled aggregate and a fine recycled aggregate; soaking the fine recycled aggregate in water continuously fed with an industrial waste gas containing carbon dioxide, and continuously stirring until that a color of the fine recycled aggregate is changed from red to yellow; then performing dehydration and mixing with the active recycled aggregate to obtain a recycled aggregate powder; wherein, the microwave irradiation treatment heats the recycled aggregate instantaneously, so that a temperature difference is formed between the inside and the outside of the recycled aggregate; the strength of an attached cement slurry (the inert recycled aggregate) outside of the recycled aggregate decreases due to the high temperature, while a natural aggregate (the active recycled aggregate) inside of the recycled aggregate forms a high-temperature stress, which causes the joints of the inside and the outside to become soft and brittle; after grinding and carrying out the pneumatic separation, the attached cement slurry and the natural aggregate are separated; the pneumatic separation uses the dense effect and the particle size effect, the attached cement slurry and the natural aggregate are separated with the reason that their movement trajectories deviate due to the different movement velocity in the gravitational field or centrifugal field; the attached cement slurry (the inert recycled aggregate) is ground; impurities such as iron oxide and magnesium oxide have high hardness and good wear resistance, and are highly enriched in the coarse recycled aggregate; the fine recycled aggregate is mainly composed of calcium oxide and silica, and reacts with carbon dioxide to generate limestone-filled silicates;

S3: performing fragmentation of the steel slag, and magnetically removing iron in the fragmented steel slag, then sieving the steel slag to obtain a crude steel slag and a fine steel slag; carrying out magnetization screening of the crude steel slag to obtain a magnetic crude steel slag and a non-magnetic crude steel slag; mixing the non-magnetic crude steel slag with the fine steel slag to process for 1-2 h at 180-240° C. and 1.2-1.8 MPa, and then grinding to obtain a steel slag powder; wherein, Fe, $Fe_3O_4$ and RO phase have high hardness and good wear resistance in the steel slag, and are highly enriched in the crude steel slag; Fe, $Fe_3O_4$ and RO phase are all magnetic coarse materials, while silicates are non-magnetic materials; performing a high-temperature and high-pressure treatment is capable of removing impurities such as magnesium oxide and calcium oxide in the steel slag, and enhancing the stability of the steel slag; magnesium oxide and calcium oxide free in the steel slag react with water vapor to generate expansion stress during the soil solidification, which decreases the stability of solidification;

S4: mixing the industrial waste gypsum with sodium citrate, then adding water to make a slurry, and ultrasonically vibrating for 5-10 min; adding the slaked lime to fully stir, and ultrasonically vibrating for 8-15 min; carrying out vacuum filtration, drying at 50-60° C., and then grinding; adding into a powder concentrator, and feeding into heated air of the industrial waste gas at 160-300° C.; screening out a gypsum powder with a predetermined particle size, and discharging ultrafine powders and light impurities with the heated air from an exhaust outlet of the powder concentrator; wherein, the industrial waste gypsum is ultrasonically vibrated to gradually remove impurities attached to the inside and surface; sodium citrate added promotes the removal of impurities to enhance the cleaning effect; the slaked lime forms insoluble salts with impurities such as phosphorus ions and fluorine ions; moisture in the industrial waste gypsum is removed by drying, and a dihydrate gypsum is converted into a hemihydrate gypsum and soluble anhydrite in the process of feeding into the heated air; particles and ultrafine powders attached to the inside and surface of the industrial waste gypsum are peeled off through the heated air and discharged from the exhaust outlet of the powder concentrator;

S5: mixing the recycled aggregate powder, the steel slag powder, the gypsum powder with the activator, and stirring for 15-20 min, then calcining at 1200-1350° C. for 1-2 h to obtain a first powder; wherein, the recycled aggregate powder and the steel slag powder are mainly the silicates which are melted by calcining to solidify and wrap heavy metal ions in the gypsum powder; the heavy metal ions replace calcium ions to bind to silicate groups and aluminate groups of the silicates to form stable and complex aluminosilicate inert minerals, which avoids the contamination of heavy metals to the soil; insoluble and dead-burned calcium sulfate in the gypsum powder is activated by calcining to enhance the water resistance of the first powder with an alkaline activator;

S6: dissolving a solution of the bioenzyme in an ethanol solution, adding a powder of diatomite, and stirring for 8-10 min at 50-60° C., then drying and carrying out centrifugal separation to obtain a second powder; wherein, the bioenzyme is easily soluble in ethanol; the powder of diatomite has a large porosity, and diatomite loaded with ethanol and the bioenzyme is obtained by fully stirring and centrifuging; ethanol coats on the surface of diatomite to protect the bioenzyme and prevent the bioenzyme from releasing during the mixing process; ethanol is easily soluble in water, and the bioenzyme is released to absorb water and change a molecular structure of the soil when the soil solidification material is mixed with water and the soil to be solidified, so that the gap between soil particles is reduced, and the compactness and load-bearing capacity are increased; the bioenzyme is capable of catalyzing to accelerate the composite formation of the soil solidification material; and S7: fully mixing the first powder, the second powder, the high-calcium fly ash, attapulgite, the chitosan-based adsorbent and the resin-based adsorbent, and cooling to room temperature to obtain the soil solidification material.

Preferably, a percentage content of carbon dioxide in the industrial waste gas is 30-100%, a feeding rate is 80-200 L/h, and a stirring rate is 50-100 r/min. The industrial waste gas may also comprise a mixture of any one or more of sulfur dioxide, sulfur monoxide, nitrogen dioxide, nitrogen monoxide and hydrogen sulfide.

A particle size of the fine recycled aggregate is 5-30 μm, a particle size of the coarse recycled aggregate is 30-50 μm, a particle size of the fine steel slag is 1-20 μm, and a particle size of the crude steel slag is 20-40 μm.

A method for using the soil solidification material based on the solid waste and the bioenzyme is provided, and the soil solidification material is mixed with water and the soil to be solidified in a weight ratio of (1-3):1:(3-9).

The beneficial effects of the present disclosure are as follows:

1. The present disclosure adopts the recycled aggregate, the steel slag, the industrial waste gypsum and the high-calcium fly ash as the main components of the soil solidification material to reduce the cost. At the same time, the bioenzyme added is capable of efficiently solidifying the soil and improving the compactness of the soil. The inorganic adsorbent added is capable of efficiently adsorbing heavy metal ions and organic acids in the mixed contaminated soil, and the organic adsorbent added is capable of efficiently adsorbing organic matters in the mixed contaminated soil. By optimizing the proportion, the strength of the solidified soil is significantly improved.

2. The soil solidification material provided by the present disclosure can be widely used for the treatment of the solid waste such as the recycled aggregate in the construction wastes and the active industrial waste, which not only improves the strength of the solidified soil, but also fundamentally solves the problems such as the environmental pollution and resource waste caused by the construction wastes and the industrial waste, and reduces the project cost and later maintenance cost.

3. The bioenzyme is easily soluble in ethanol. The powder of diatomite has large porosity. The present disclosure uses diatomite to load ethanol and the bioenzyme, so that ethanol coats on the surface of diatomite to protect the bioenzyme and prevent the bioenzyme from releasing during the mixing process. Ethanol is easily soluble in water, and the bioenzyme is released to absorb water and change a molecular structure of the soil when the soil solidification material is mixed with water and the soil to be solidified, so that the gap between soil particles is reduced, and the compactness and load-bearing capacity are increased. The bioenzyme is capable of catalyzing to accelerate the composite formation of the soil solidification material.

4. The soil solidification material of the present disclosure is powdery particles, which is easy to store and transport. Compared with the liquid soil solidification material, the soil solidification material of the present disclosure is more fully mixed when mixed with the soil to be solidified, which is more conducive to the improvement of solidification strength.

DETAILED DESCRIPTION OF THE EMBODIMENTS

Figure 1:
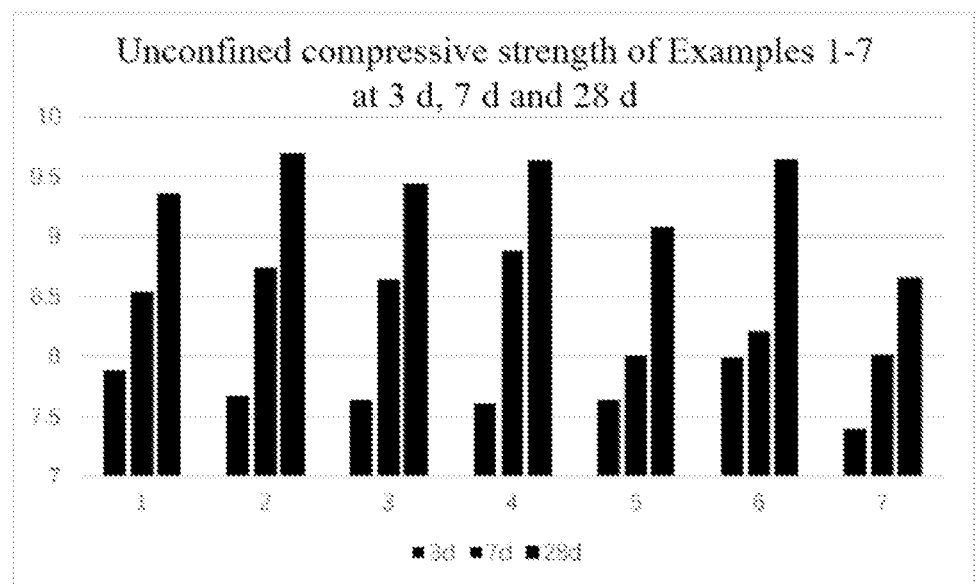
FIG. 1 is a histogram of unconfined compressive strength of Examples 1-7 at 3 d, 7 d and 28 d in the present disclosure; wherein, the histogram is Examples 1-7 from left to right.
Figure 2:
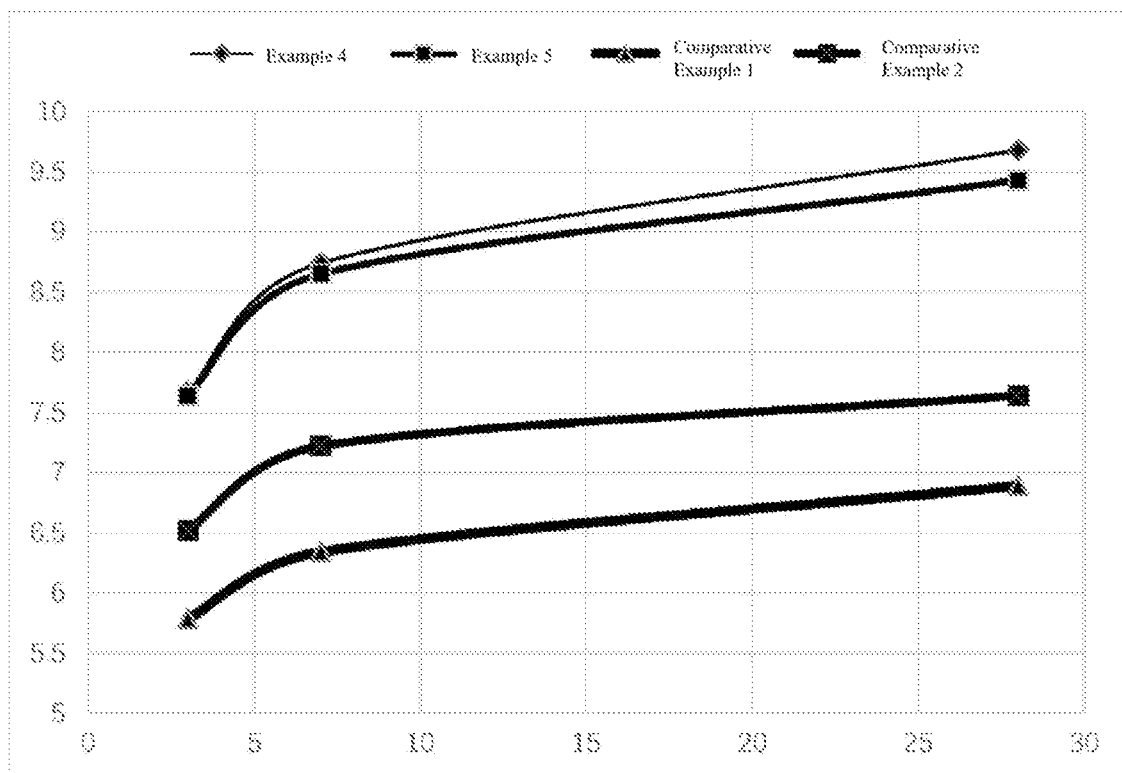
FIG. 2 is a curve diagram of the unconfined compressive strength of Examples 4-5 and Comparative Examples 1-2 in the present disclosure over time.

The technical solutions of the present disclosure will be clearly and completely described below. Obviously, the described examples are only part but not all of the examples of the present disclosure. Based on the examples of the present disclosure, all other examples obtained by those ordinarily skilled in the art without creative efforts shall fall within the protection scope of the present disclosure.

To understand the present disclosure better, specific examples are described in details as follows.

Example 1

The soil solidification material based on the solid waste and the bioenzyme is composed of the following components: the recycled aggregate 22 kg, the steel slag 20 kg, the high-calcium fly ash 16 kg, the bioenzyme 3 kg, attapulgite 5 kg diatomite 5 kg, the TENZON resin adsorbent 4 kg, the chitosan-alginate powder 4 kg, phosphogypsum 25 kg, sodium hydroxide 20 kg, sodium citrate 1 part, and the slaked lime 0.02 part.

The method for preparing the soil solidification material based on the solid waste and the bioenzyme includes the following steps:

S1: The recycled aggregate 22 kg, the steel slag 20 kg, the high-calcium fly ash 16 kg, the bioenzyme 3 kg, attapulgite 5 kg diatomite 5 kg, the TENZON resin adsorbent 4 kg, the chitosan-alginate powder 4 kg, phosphogypsum 25 kg, sodium hydroxide 20 kg, sodium citrate 1 part, and the slaked lime 0.02 part are weighed.

S2: The recycled aggregate is performed with the microwave irradiation treatment for 15 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 30%, the feeding rate is 80 L/h, and the stirring rate is 50 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 1 h at 180° C. and 1.2 MPa, and then ground to obtain the steel slag powder.

S4: The industrial waste gypsum is mixed with sodium citrate, and then water is added to make the slurry. The obtained slurry is ultrasonically vibrated for 5 min, and then the slaked lime is added to fully stir and ultrasonically vibrate for 8 min. After the vacuum filtration, drying is performed at 50° C. Then, the obtained product is ground and added into the powder concentrator, and the heated air of the industrial waste gas is fed at 160° C. with the feeding rate of 80 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 15 min, and then calcine at 1200° C. for 1 h, to obtain the first powder.

S6: The solution of the bioenzyme is dissolved in the ethanol solution, and the powder of diatomite is added to stir for 8 min at 50° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days.

The results are that the compressive strength at 3 d is 7.88 MPa, the compressive strength at 7 d is 8.54 MPa, and the compressive strength at 28 d is 9.35 MPa.

Example 2

The soil solidification material based on the solid waste and the bioenzyme is composed of the following components: the recycled aggregate 22 kg, the steel slag 25 kg, the high-calcium fly ash 18 kg, the bioenzyme 4 kg, attapulgite 7 kg diatomite 7 kg, the TENZON resin adsorbent 6 kg, the chitosan-alginate powder 6 kg, phosphogypsum 30 kg, sodium hydroxide 22.5 kg, sodium citrate 2 parts, and the slaked lime 0.08 part.

The method for preparing the soil solidification material based on the solid waste and the bioenzyme includes the following steps:

S1: The recycled aggregate 22 kg, the steel slag 25 kg, the high-calcium fly ash 18 kg, the bioenzyme 4 kg, attapulgite 7 kg diatomite 7 kg, the TENZON resin adsorbent 6 kg, the chitosan-alginate powder 6 kg, phosphogypsum 30 kg, sodium hydroxide 22.5 kg, sodium citrate 2 parts, and the slaked lime 0.08 part are weighed.

S2: The recycled aggregate is performed with the microwave irradiation treatment for 18 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 50%, the feeding rate is 100 L/h, and the stirring rate is 60 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 1 h at 200° C. and 1.3 MPa, and then ground to obtain the steel slag powder.

S4: The industrial waste gypsum is mixed with sodium citrate, and then water is added to make the slurry. The obtained slurry is ultrasonically vibrated for 6 min, and then the slaked lime is added to fully stir and ultrasonically vibrate for 10 min. After the vacuum filtration is performed, drying is performed at 50° C. Then, the obtained product is ground and added into the powder concentrator, and the heated air of the industrial waste gas is fed at 180° C. with the feeding rate of 100 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 15 min, and then calcine at 1280° C. for 1 h, to obtain the first powder.

S6: The solution of the bioenzyme is dissolved in the ethanol solution, and the powder of diatomite is added to stir for 8 min at 50° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.67 MPa, the compressive strength at 7 d is 8.74 MPa, and the compressive strength at 28 d is 9.68 MPa.

Example 3

The soil solidification material based on the solid waste and the bioenzyme is composed of the following components: the recycled aggregate 25 kg, the steel slag 30 kg, the high-calcium fly ash 20 kg, the bioenzyme 10 kg, attapulgite 9 kg diatomite 9 kg, the TENZON resin adsorbent 10 kg, the chitosan-alginate powder 10 kg, phosphogypsum 30 kg, sodium hydroxide 22.5 kg, sodium citrate 2 parts, and the slaked lime 0.1 part.

The method for preparing the soil solidification material based on the solid waste and the bioenzyme includes the following steps:

S1: The recycled aggregate 25 kg, the steel slag 30 kg, the high-calcium fly ash 20 kg, the bioenzyme 10 kg, attapulgite 9 kg diatomite 9 kg, the TENZON resin adsorbent 10 kg, the chitosan-alginate powder 10 kg, phosphogypsum 30 kg, sodium hydroxide 22.5 kg, sodium citrate 2 parts, and the slaked lime 0.1 part are weighed.

S2: The recycled aggregate is performed with the microwave irradiation treatment for 20 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 50%, the feeding rate is 100 L/h, and the stirring rate is 60 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 2 h at 200° C. and 1.3 MPa, and then ground to obtain the steel slag powder.

S4: The industrial waste gypsum is mixed with sodium citrate, and then water is added to make the slurry. The obtained slurry is ultrasonically vibrated for 8 min, and then the slaked lime is added to fully stir and ultrasonically vibrate for 12 min. After the vacuum filtration is performed, drying is performed at 60° C. Then, the obtained product is ground and added into the powder concentrator, and the heated air of the industrial waste gas is fed at 200° C. with the feeding rate of 100 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 20 min, and then calcine at 1300° C. for 1.5 h, to obtain the first powder.

S6: The solution of the bioenzyme is dissolved in the ethanol solution, and the powder of diatomite is added to stir for 10 min at 60° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.64 MPa, the compressive strength at 7 d is 8.65 MPa, and the compressive strength at 28 d is 9.43 MPa.

Example 4

The soil solidification material based on the solid waste and the bioenzyme is composed of the following components: the recycled aggregate 28 kg, the steel slag 26 kg, the high-calcium fly ash 16 kg, the bioenzyme 4 kg, attapulgite 5 kg diatomite 5 kg, the TENZON resin adsorbent 4 kg, the chitosan-alginate powder 4 kg, phosphogypsum 28 kg, sodium hydroxide 25 kg, sodium citrate 1 part, and the slaked lime 0.05 part.

The method for preparing the soil solidification material based on the solid waste and the bioenzyme includes the following steps:

S1: The recycled aggregate 28 kg, the steel slag 26 kg, the high-calcium fly ash 16 kg, the bioenzyme 4 kg, attapulgite 5 kg diatomite 5 kg, the TENZON resin adsorbent 4 kg, the chitosan-alginate powder 4 kg, phosphogypsum 28 kg, sodium hydroxide 25 kg, sodium citrate 1 part, and the slaked lime 0.05 part are weighed.

S2: The recycled aggregate is performed with the microwave irradiation treatment for 24 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 60%, the feeding rate is 120 L/h, and the stirring rate is 70 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 1.5 h at 210° C. and 1.5 MPa, and then ground to obtain the steel slag powder.

S4: The industrial waste gypsum is mixed with sodium citrate, and then water is added to make the slurry. The obtained slurry is ultrasonically vibrated for 5-10 min, and then the slaked lime is added to fully stir and ultrasonically vibrate for 8-15 min. After the vacuum filtration is performed, drying is performed at 55° C. Then, the obtained product is ground and added into the powder concentrator, and the heated air of the industrial waste gas is fed at 160° C. with the feeding rate of 120 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 18 min, and then calcine at 1300° C. for 1.5 h, to obtain the first powder.

S6: The solution of the bioenzyme is dissolved in the ethanol solution, and the powder of diatomite is added to stir for 10 min at 55° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.61 MPa, the compressive strength at 7 d is 8.88 MPa, and the compressive strength at 28 d is 9.63 MPa.

Example 5

The soil solidification material based on the solid waste and the bioenzyme is composed of the following components: the recycled aggregate 30 kg, the steel slag 25 kg, the high-calcium fly ash 18 kg, the bioenzyme 6 kg, attapulgite 6 kg diatomite 6 kg, the TENZON resin adsorbent 5 kg, the chitosan-alginate powder 5 kg, phosphogypsum 30 kg, sodium hydroxide 25 kg, sodium citrate 1.5 parts, and the slaked lime 0.12 part.

The method for preparing the soil solidification material based on the solid waste and the bioenzyme includes the following steps:

S1: The recycled aggregate 30 kg, the steel slag 25 kg, the high-calcium fly ash 18 kg, the bioenzyme 6 kg, attapulgite 6 kg diatomite 6 kg, the TENZON resin adsorbent 5 kg, the chitosan-alginate powder 5 kg, phosphogypsum 30 kg, sodium hydroxide 25 kg, sodium citrate 1.5 parts, and the slaked lime 0.12 part are weighed.

S2: The recycled aggregate is performed with the microwave irradiation treatment for 20 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 80%, the feeding rate is 180 L/h, and the stirring rate is 80 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 1.8 h at 230° C. and 1.6 MPa, and then ground to obtain the steel slag powder.

S4: The industrial waste gypsum is mixed with sodium citrate, and then water is added to make the slurry. The obtained slurry is ultrasonically vibrated for 5-10 min, and then the slaked lime is added to fully stir and ultrasonically vibrate for 8-15 min. After the vacuum filtration is performed, drying is performed at 60° C. Then, the obtained product is ground and added into the powder concentrator, and the heated air of the industrial waste gas is fed at 250° C. with the feeding rate of 180 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 15 min, and then calcine at 1250° C. for 1 h, to obtain the first powder.

S6: The solution of the bioenzyme is dissolved in the ethanol solution, and the powder of diatomite is added to stir for 10 min at 50° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.64 MPa, the compressive strength at 7 d is 8.01 MPa, and the compressive strength at 28 d is 9.07 MPa.

Example 6

The soil solidification material based on the solid waste and the bioenzyme is composed of the following components: the recycled aggregate 32 kg, the steel slag 25 kg, the high-calcium fly ash 18 kg, the bioenzyme 8 kg, attapulgite 7 kg diatomite 7 kg, the TENZON resin adsorbent 6 kg, the chitosan-alginate powder 6 kg, phosphogypsum 30 kg, sodium hydroxide 30 kg, sodium citrate 1.5 parts, and the slaked lime 0.12 part.

The method for preparing the soil solidification material based on the solid waste and the bioenzyme includes the following steps:

S1: The recycled aggregate 32 kg, the steel slag 25 kg, the high-calcium fly ash 18 kg, the bioenzyme 8 kg, attapulgite 7 kg diatomite 7 kg, the TENZON resin adsorbent 6 kg, the chitosan-alginate powder 6 kg, phosphogypsum 30 kg, sodium hydroxide 30 kg, sodium citrate 1.5 parts, and the slaked lime 0.12 part are weighed.

S2: The recycled aggregate is performed with the microwave irradiation treatment for 18 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 50%, the feeding rate is 100 L/h, and the stirring rate is 60 r/min. Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 2 h at 230° C. and 1.7 MPa, and then ground to obtain the steel slag powder.

S4: The industrial waste gypsum is mixed with sodium citrate, and then water is added to make the slurry. The obtained slurry is ultrasonically vibrated for 5-10 min, and then the slaked lime is added to fully stir and ultrasonically vibrate for 8-15 min. After the vacuum filtration is performed, drying is performed at 50° C. Then, the obtained product is ground and added into the powder concentrator, and the heated air of the industrial waste gas is fed at 160° C. with the feeding rate of 100 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 18 min, and then calcine at 1270° C. for 1.8 h, to obtain the first powder.

S6: The solution of the bioenzyme is dissolved in the ethanol solution, and the powder of diatomite is added to stir for 8 min at 50° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.99 MPa, the compressive strength at 7 d is 8.21 MPa, and the compressive strength at 28 d is 9.64 MPa.

Example 7

The soil solidification material based on the solid waste and the bioenzyme is composed of the following components: the recycled aggregate 35 kg, the steel slag 25 kg, the high-calcium fly ash 18 kg, the bioenzyme 8 kg, attapulgite 7 kg diatomite 7 kg, the TENZON resin adsorbent 6 kg, the chitosan-alginate powder 6 kg, phosphogypsum 30 kg, sodium hydroxide 30 kg, sodium citrate 3 parts, and the slaked lime 0.2 part.

The method for preparing the soil solidification material based on the solid waste and the bioenzyme includes the following steps:

S1: The recycled aggregate 35 kg, the steel slag 25 kg, high-calcium fly ash 18 kg, the bioenzyme 8 kg, attapulgite 7 kg diatomite 7 kg, the TENZON resin adsorbent 6 kg, the chitosan-alginate powder 6 kg, phosphogypsum 30 kg, sodium hydroxide 30 kg, sodium citrate 3 parts, and the slaked lime 0.2 part are weighed.

S2: The recycled aggregate is performed with the microwave irradiation treatment for 24 min with the microwave power density of 1.714 W/cm$^2$, and then grinding and pneumatic separation are performed to obtain the active recycled aggregate and the inert recycled aggregate. The inert recycled aggregate is sieved to obtain the coarse recycled aggregate and the fine recycled aggregate. The fine recycled aggregate is soaked in water continuously fed with the industrial waste gas containing carbon dioxide, to continuously stir until that the color of the fine recycled aggregate is changed from red to yellow. The percentage content of carbon dioxide in the industrial waste gas is 80%, the feeding rate is 200 L/h, and the stirring rate is 100 r/min.

Then, the fine recycled aggregate is performed with dehydration and then mixed with the active recycled aggregate to obtain the recycled aggregate powder.

S3: The fragmentation of the steel slag is performed, and the iron in the fragmented steel slag is magnetically removed. Then, the steel slag is sieved to obtain the crude steel slag and the fine steel slag. The magnetization screening of the crude steel slag is performed to obtain the magnetic crude steel slag and the non-magnetic crude steel slag. The non-magnetic crude steel slag is mixed with the fine steel slag to process for 1 h at 240° C. and 1.8 MPa, and then ground to obtain the steel slag powder.

S4: The industrial waste gypsum is mixed with sodium citrate, and then water is added to make the slurry. The obtained slurry is ultrasonically vibrated for 5-10 min, and then the slaked lime is added to fully stir and ultrasonically vibrate for 8-15 min. After the vacuum filtration is performed, drying is performed at 50° C. Then, the obtained product is ground and added into the powder concentrator, and the heated air of the industrial waste gas is fed at 160° C. with the feeding rate of 200 L/h. The gypsum powder with the predetermined particle size is screened out, and the ultrafine powders and light impurities are discharged with the heated air from the exhaust outlet of the powder concentrator.

S5: The recycled aggregate powder, the steel slag powder and the gypsum powder are mixed with the powder of sodium hydroxide to stir for 15 min, and then calcine at 1350° C. for 2 h, to obtain the first powder.

S6: The solution of the bioenzyme is dissolved in the ethanol solution, and the powder of diatomite is added to stir for 8 min at 50° C., and then dry and carry out the centrifugal separation to obtain the second powder.

S7: The first powder, the second powder, the high-calcium fly ash, attapulgite, the chitosan-alginate powder and the TENZON resin adsorbent are fully mixed, and then cooled to room temperature, to obtain the soil solidification material.

The method for using the soil solidification material based on the solid waste and the bioenzyme is as follows: the soil solidification material, water and the sludge to be solidified are mixed in the weight ratio of 2:1:5, and the unconfined compressive strength is detected after 3 days. The results are that the compressive strength at 3 d is 7.40 MPa, the compressive strength at 7 d is 8.02 MPa, and the compressive strength at 28 d is 8.65 MPa.

Comparative Example 1

Compared with Example 4, the difference in this Comparative Example is that the soil solidification material is composed of the following components: the cement 25 kg, the sand 35 kg, and the high-calcium fly ash 16 kg.

The soil solidification material, water and the soil to be solidified are mixed in the weight ratio of 2:1:5, and the unconfined compressive strength is detected after 3 days. The results are that the compressive strength at 3 d is 5.78 MPa, the compressive strength at 7 d is 6.34 MPa, and the compressive strength at 28 d is 6.89 MPa.

Comparative Example 2

S1: The recycled aggregate 22 kg, water 90 kg, the steel slag 20 kg, the high-calcium fly ash 16 kg, the bioenzyme 3 kg, attapulgite 5 kg, diatomite 5 kg, the TENZON resin adsorbent 4 kg, the chitosan-alginate powder 4 kg, and the powder of sodium hydroxide 20 kg are weighed.

S2: The recycled aggregate, water, the steel slag and the high-calcium fly ash are dissolved and mixed to stir for 15 min at 80° C., to obtain the first slurry.

S3: The bioenzyme is added into the first slurry to stir for 8 min at 50° C., to obtain the second slurry.

S4: Attapulgite, diatomite, the TENZON resin adsorbent and the chitosan-alginate powder are sequentially added into the second slurry to stir until that the second slurry is cooled to room temperature, to obtain the soil solidification material.

The soil solidification material, water and the sludge to be solidified are mixed in the weight ratio of 2:1:5, and the unconfined compressive strength is detected after 3 days. The results are that the compressive strength at 3 d is 6.52 MPa, the compressive strength at 7 d is 7.22 MPa, and the compressive strength at 28 d is 7.64 MPa.

It can be seen from the detection results that the present disclosure obtains the soil solidification material in a powdery form by multiple processing of the raw materials. The unconfined compressive strength at 3 d reaches more than 7 MPa, which is better than the soil solidification material with the natural construction materials as the main components and the untreated soil solidification material. At the same time, the soil solidification material of the present disclosure also meets the national requirements on the energy and environmental protection, worth being popularized.

The examples described in the present disclosure are the preferred examples, not intended to limit the present disclosure. According to the above-mentioned examples, different extensions and variations can be easily made by those ordinarily skilled in the art without departing from the spirit of the present disclosure, which shall fall within the protection scope of the present disclosure.

What is claimed is:

1. A soil solidification material based on solid waste and bioenzyme, wherein, the soil solidification material is composed of the following components in parts by weight: recycled aggregate 22-35 parts, steel slag 20-30 parts, high-calcium fly ash 16-24 parts, the bioenzyme 5-15 parts, an inorganic adsorbent 10-18 parts, an organic adsorbent 8-20 parts, industrial waste gypsum 25-35 parts, an activator 20-30 parts, sodium citrate 1-3 parts, and slaked lime 0.02-0.2 part.

2. The soil solidification material based on the solid waste and the bioenzyme according to claim 1, wherein, the organic adsorbent is a chitosan-based adsorbent and a resin-based adsorbent; the chitosan-based adsorbent is a chitosan-alginate powder, and the resin-based adsorbent is a styrene-based polymer; the inorganic adsorbent is diatomite and attapulgite.

3. The soil solidification material based on the solid waste and the bioenzyme according to claim 1, wherein, the industrial waste gypsum is selected from a mixture of any one or more of phosphogypsum, flue gas desulfurization gypsum, citrogypsum, borogypsum, and titanogypsum; the industrial waste gypsum is a powder obtained by ultrasonically vibrating, drying, grinding, and sieving, with a particle size of 10-30 μm.

4. The soil solidification material based on the solid waste and the bioenzyme according to claim 1, wherein, the steel slag is a powder obtained by grinding and removing impurities from steelmaking slag, with a particle size of 1-20 μm.

5. The soil solidification material based on the solid waste and the bioenzyme according to claim 1, wherein, the recycled aggregate is a powder obtained by grinding, sieving and carbonizing waste concrete in construction wastes, with a particle size of 5-30 μm.

6. The soil solidification material based on the solid waste and the bioenzyme according to claim 1, wherein, the activator is a mixture of any one or more of sodium hydroxide, potassium hydroxide, sodium silicate, and sodium sulfate.

7. A method for preparing a soil solidification material based on solid waste and bioenzyme, wherein, comprising the following steps:
- S1: weighing recycled aggregate 22-35 parts, industrial waste gypsum 25-35 parts, steel slag 20-30 parts, high-calcium fly ash 16-24 parts, the bioenzyme 5-15 parts, diatomite 5-9 parts, attapulgite 5-9 parts, a chitosan-based adsorbent 4-10 parts, a resin-based adsorbent 4-10 parts, an activator 20-30 parts, sodium citrate 1-3 parts, and slaked lime 0.02-0.2 part;
- S2: performing a microwave irradiation treatment on the recycled aggregate for 15-24 min with a microwave power density of 1.714 $W/cm^2$, then grinding and carrying out pneumatic separation to obtain an active recycled aggregate and an inert recycled aggregate; sieving the inert recycled aggregate to obtain a coarse recycled aggregate and a fine recycled aggregate; soaking the fine recycled aggregate in water continuously fed with an industrial waste gas containing carbon dioxide, and continuously stirring until that a color of the fine recycled aggregate is changed from red to yellow; then performing dehydration and mixing with the active recycled aggregate to obtain a recycled aggregate powder,
- S3: performing fragmentation of the steel slag, and magnetically removing iron in the fragmented steel slag, then sieving the steel slag to obtain a crude steel slag and a fine steel slag; carrying out magnetization screening of the crude steel slag to obtain a magnetic crude steel slag and a non-magnetic crude steel slag; mixing the non-magnetic crude steel slag with the fine steel slag to process for 1-2 h at 180-240° C. and 1.2-1.8 MPa, and then grinding to obtain a steel slag powder;
- S4: mixing the industrial waste gypsum with sodium citrate, then adding water to make a slurry, and ultrasonically vibrating for 5-10 min; adding the slaked lime to fully stir, and ultrasonically vibrating for 8-15 min; carrying out vacuum filtration, drying at 50-60° C., and then grinding; adding into a powder concentrator, and feeding into heated air of the industrial waste gas at 160-300° C.; screening out a gypsum powder with a predetermined particle size, and discharging ultrafine powders and light impurities with the heated air from an exhaust outlet of the powder concentrator;
- S5: mixing the recycled aggregate powder, the steel slag powder, the gypsum powder with the activator, and stirring for 15-20 min, then calcining at 1200-1350° C. for 1-2 h to obtain a first powder;
- S6: dissolving a solution of the bioenzyme in an ethanol solution, adding a powder of diatomite, and stirring for 8-10 min at 50-60° C., then drying and carrying out centrifugal separation to obtain a second powder; and
- S7: fully mixing the first powder, the second powder, the high-calcium fly ash, attapulgite, the chitosan-based adsorbent and the resin-based adsorbent, and cooling to room temperature to obtain the soil solidification material.

8. The method for preparing the soil solidification material based on the solid waste and the bioenzyme according to claim 7, wherein, a percentage content of carbon dioxide in the industrial waste gas is 30-100%, a feeding rate is 80-200 L/h, and a stirring rate is 50-100 r/min.

9. The method for preparing the soil solidification material based on the solid waste and the bioenzyme according to claim 7, wherein, a particle size of the fine recycled aggregate is 5-30 μm, a particle size of the coarse recycled aggregate is 30-50 μm, a particle size of the fine steel slag is 1-20 μm, and a particle size of the crude steel slag is 20-40 μm.

10. A method for using a soil solidification material based on solid waste and bioenzyme, wherein, the soil solidification material is mixed with water and soil to be solidified in a weight ratio of (1-3):1:(3-9).

* * * * *